(12) United States Patent
Boote

(10) Patent No.: US 8,537,295 B2
(45) Date of Patent: Sep. 17, 2013

(54) METHODS OF SWITCHING AND APPARATUS COMPRISING AN ELECTRICALLY ACTUATED VARIABLE TRANSMISSION MATERIAL

(75) Inventor: Joseph Jeremy Boote, Ormskirk (GB)

(73) Assignee: Pilkington Group Limited, Merseyside (GB)

( * ) Notice: Subject to any disclaimer, the term of this patent is extended or adjusted under 35 U.S.C. 154(b) by 195 days.

(21) Appl. No.: 13/120,232

(22) PCT Filed: Sep. 22, 2009

(86) PCT No.: PCT/GB2009/051233
§ 371 (c)(1),
(2), (4) Date: Mar. 22, 2011

(87) PCT Pub. No.: WO2010/032069
PCT Pub. Date: Mar. 25, 2010

(65) Prior Publication Data
US 2011/0170030 A1    Jul. 14, 2011

(30) Foreign Application Priority Data
Sep. 22, 2008 (GB) .................... 0817296.7

(51) Int. Cl.
*G02F 1/136* (2006.01)
*G02F 1/1333* (2006.01)
*G02B 26/00* (2006.01)
(52) U.S. Cl.
USPC ............... 349/41; 349/88; 359/238; 359/296
(58) Field of Classification Search
USPC ............... 349/41, 88; 359/238, 296
See application file for complete search history.

(56) References Cited

U.S. PATENT DOCUMENTS

| | | |
|---|---|---|
| 3,675,988 A | 7/1972 | Soref |
| 3,773,684 A | 11/1973 | Marks |

(Continued)

FOREIGN PATENT DOCUMENTS

| | | |
|---|---|---|
| DE | 43 28 726 A1 | 3/1995 |
| DE | 198 14 094 A1 | 10/1999 |

(Continued)

OTHER PUBLICATIONS

Search Report dated Jan. 21, 2009, issued by the United Kingdom Patent Office in the corresponding United Kingdom Patent Application No. GB0817296.7. (3 pages).

(Continued)

*Primary Examiner* — Mike Qi
(74) *Attorney, Agent, or Firm* — Buchanan Ingersoll & Rooney PC

(57) ABSTRACT

A method of switching an electrically actuated variable transmission layer is disclosed. The layer is between a first electrode and a second electrode, and when a sufficiently high frequency alternating electric field is applied between the first and second electrodes, a selective region of the layer in between the first and second electrodes is switched. Apparatus for use as a glazing pane having a sheet of glazing material and an electrically actuated variable transmission layer facing the sheet of glazing material is also disclosed. The layer is sandwiched between a first electrode and a second electrode. There is an electric field generator in electrical communication with the electrodes and being configured to produce an alternating electric field of sufficient strength and of a sufficiently high frequency to switch a selected region of the layer in between the first and second electrodes.

28 Claims, 14 Drawing Sheets

(56) References Cited

U.S. PATENT DOCUMENTS

| | | | |
|---|---|---|---|
| 4,106,858 A | | 8/1978 | Dargent et al. |
| 4,139,278 A | | 2/1979 | Matsumoto et al. |
| 5,042,923 A | * | 8/1991 | Wolf et al. .............. 359/275 |
| 6,055,088 A | * | 4/2000 | Fix et al. .................. 359/265 |
| 6,301,040 B1 | | 10/2001 | Chakrapani et al. |
| 6,407,847 B1 | | 6/2002 | Poll et al. |
| 6,580,472 B1 | | 6/2003 | Willingham et al. |
| 6,804,040 B2 | | 10/2004 | Malvino et al. |
| 2002/0041424 A1 | | 4/2002 | Lynam |
| 2002/0075552 A1 | | 6/2002 | Poll et al. |
| 2003/0227663 A1 | * | 12/2003 | Agrawal et al. .............. 359/265 |
| 2004/0160660 A1 | | 8/2004 | Malvino |
| 2004/0257649 A1 | | 12/2004 | Heikkila et al. |
| 2007/0053053 A1 | | 3/2007 | Moskowitz |

FOREIGN PATENT DOCUMENTS

| | | | |
|---|---|---|---|
| EP | 1 484 634 | * | 12/2004 |
| EP | 1 484 634 A1 | | 12/2007 |
| FR | 2 824 172 A1 | | 10/2002 |
| JP | 2004-138795 A | | 5/2004 |
| WO | 92/04522 A1 | | 3/1992 |
| WO | 01/01191 A1 | | 1/2001 |
| WO | WO 02/08826 A1 | | 1/2002 |
| WO | 02/29471 A1 | | 4/2002 |
| WO | 2006/078546 A2 | | 7/2006 |
| WO | WO 2007/010542 A1 | | 1/2007 |
| WO | 2007/122426 A1 | | 11/2007 |
| WO | 2007/122428 A1 | | 11/2007 |
| WO | 2007/122429 A1 | | 11/2007 |
| WO | WO 2007/122428 A1 | * | 11/2007 |

OTHER PUBLICATIONS

Office Action dated Apr. 12, 2012, issued by the European Patent Office in the corresponding European Patent Application No. 09 785 681.9. (5 pages).

International Search Report (PCT/ISA/210) issued on Feb. 25, 2010, by United Kingdom Patent Office as the International Searching Authority for International Application No. PCT/GB2009/051233.

Written Opinion (PCT/ISA/237) issued on Feb. 25, 2010, by United Kingdom Patent Office as the International Searching Authority for International Application No. PCT/GB2009/051233.

* cited by examiner

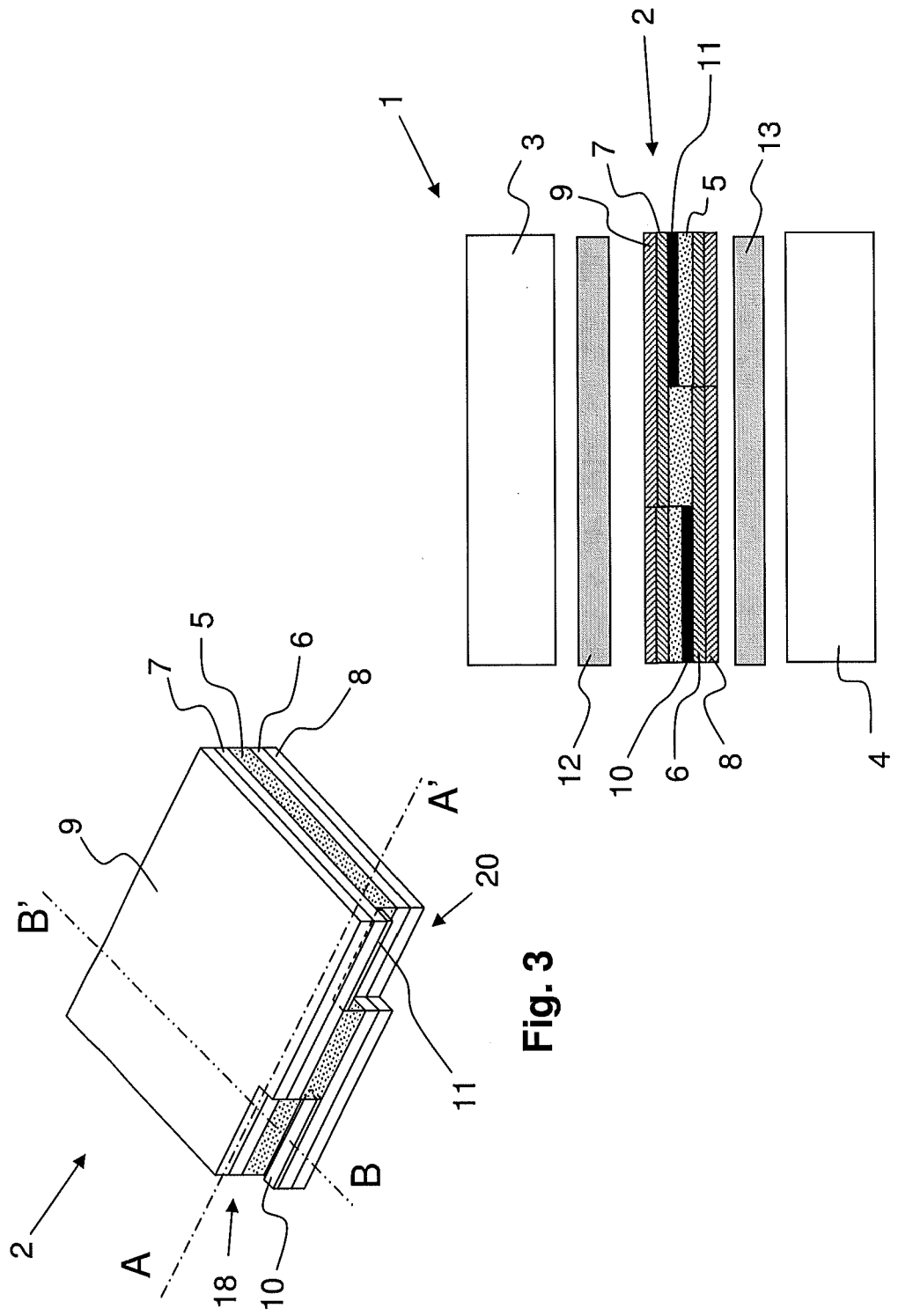

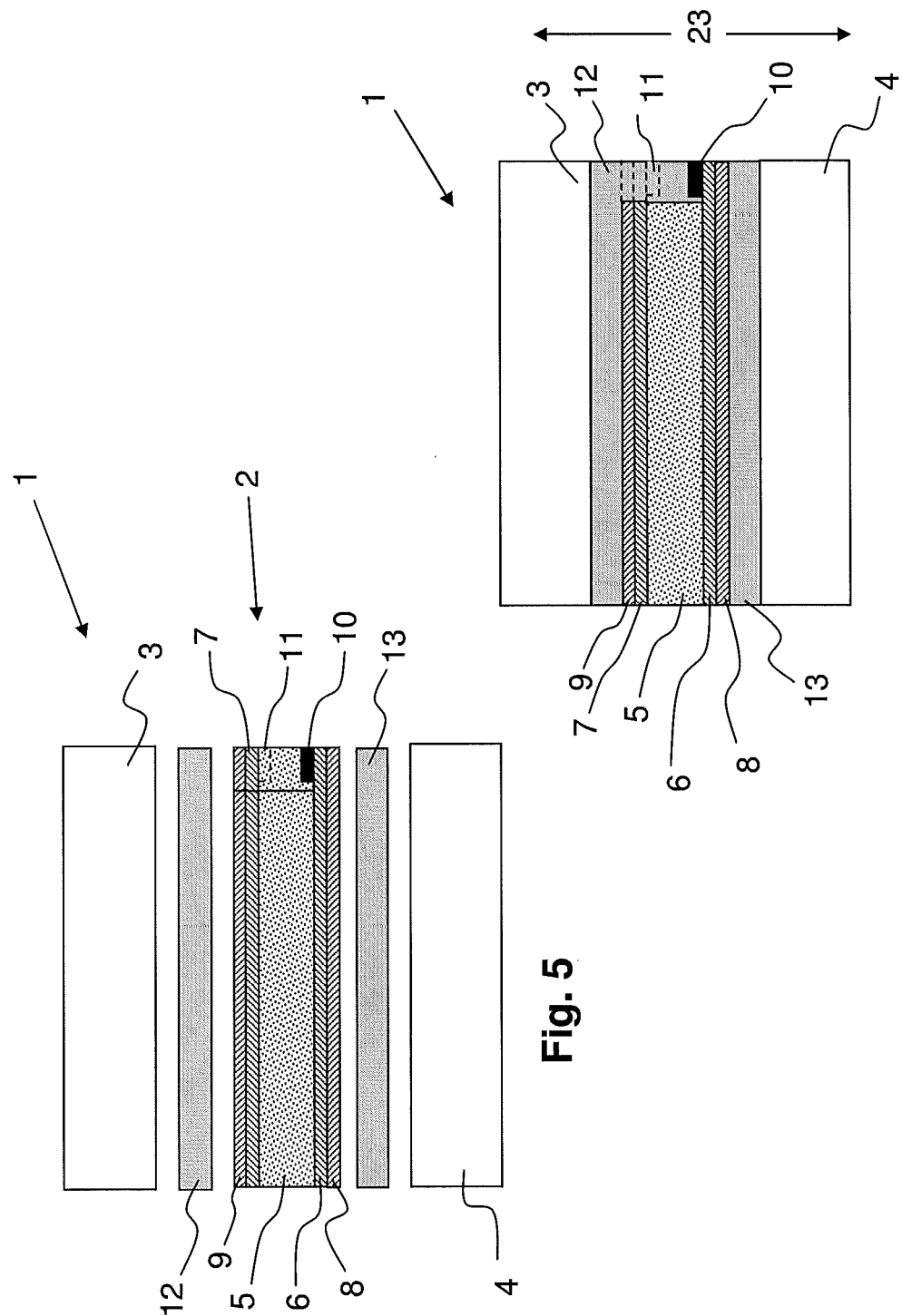

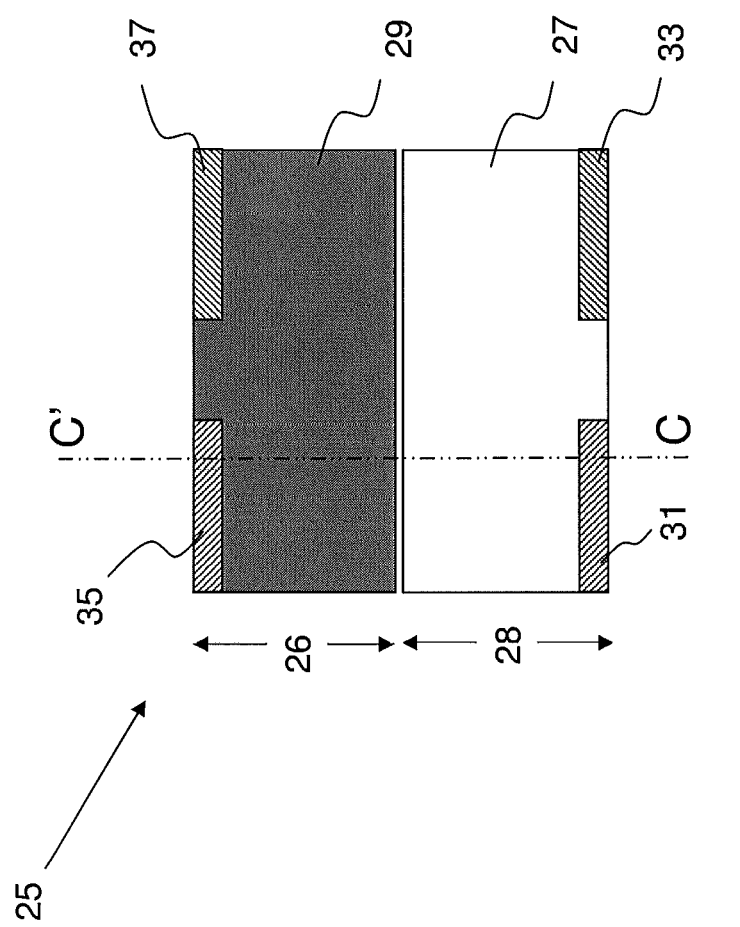

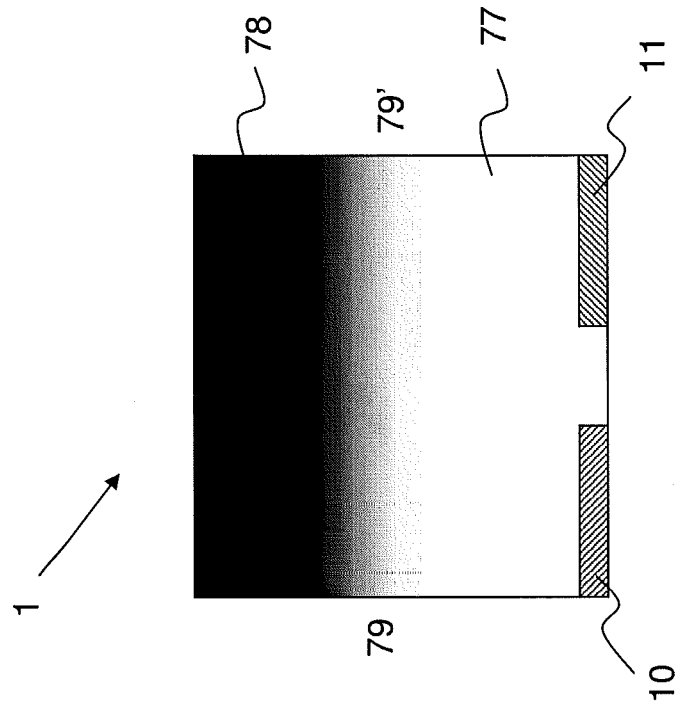
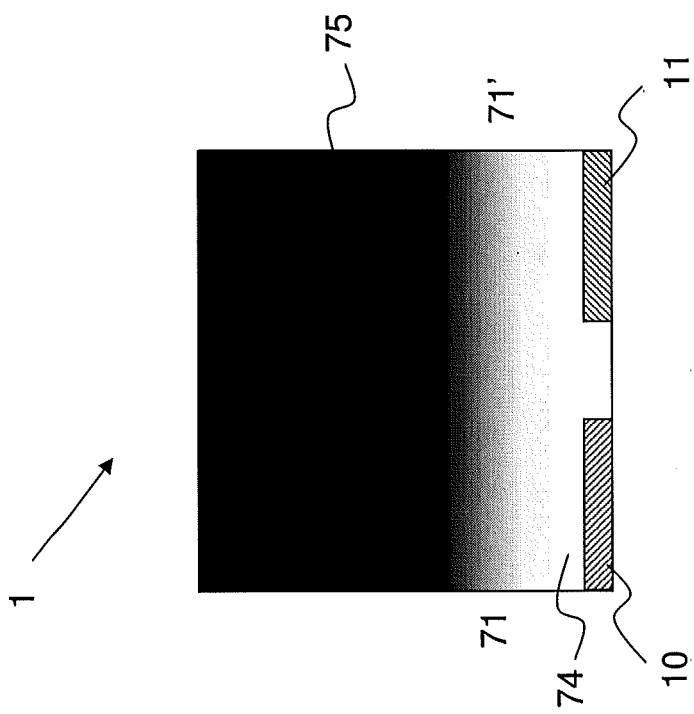

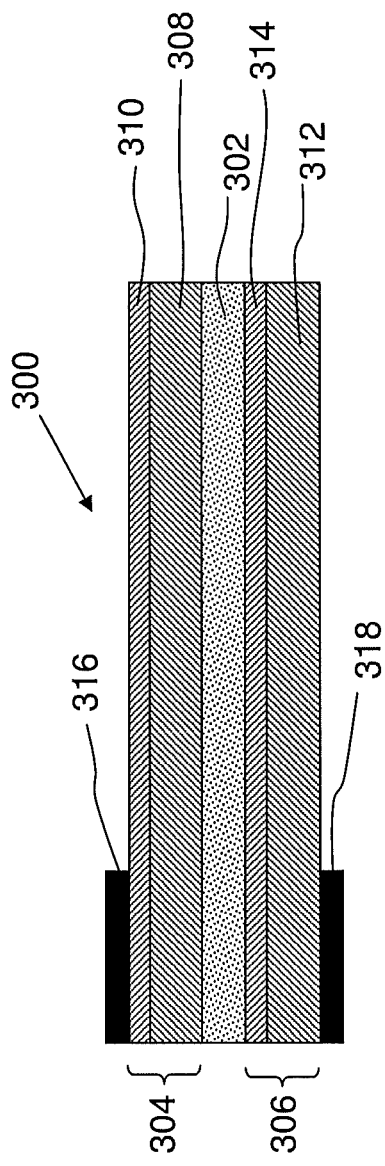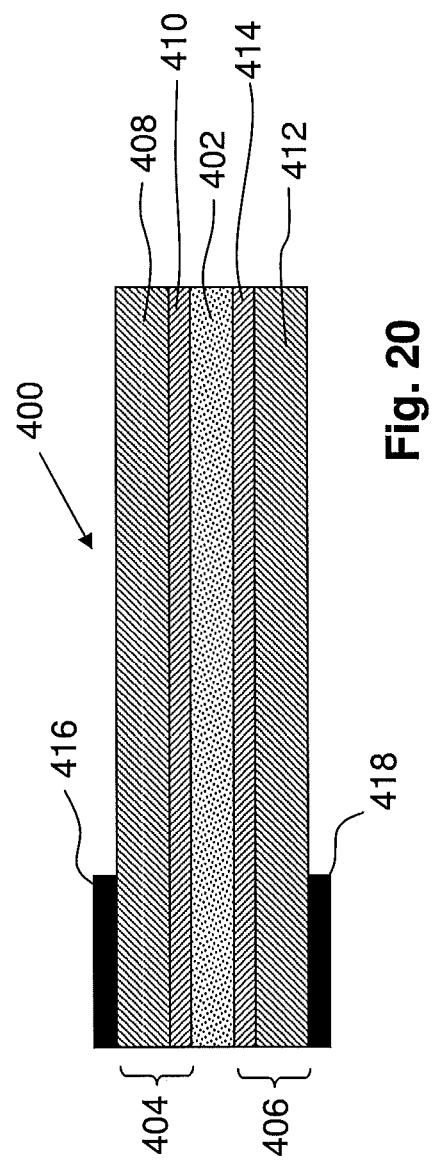

METHODS OF SWITCHING AND APPARATUS COMPRISING AN ELECTRICALLY ACTUATED VARIABLE TRANSMISSION MATERIAL

The present invention relates to methods for switching an electrically actuated variable transmission layer and to an apparatus for use as a glazing pane having a selectively switchable region.

Electrically actuated variable transmission materials are well known. For example, one class of such materials are liquid crystals. Liquid crystals are used in liquid crystal displays and rely on the optical properties of certain liquid crystalline substances in the presence or absence of an applied electric field. In a typical device, a liquid crystal layer (typically 10 µm thick) sits between two crossed polarisers. The liquid crystal alignment is chosen so that in the relaxed phase the liquid crystal is twisted. This twisted phase reorients light that has passed through the first polarizer, allowing it to be transmitted through the second polarizer (and reflected back to the observer if a reflector is provided). The device thus appears transparent. When an electric field is applied to the liquid crystal layer, the long molecular axes tend to align parallel to the electric field thus gradually untwisting in the center of the liquid crystal layer. In this state, the mesogens do not reorient light, so the light polarized at the first polarizer is absorbed at the second polarizer, and the device loses transparency with increasing voltage. In this way, the electric field can be used to make a pixel switch between transparent or opaque on command.

Another well known class of electrically actuated material is known as a suspended particle device film, or SPD film for short. Such SPD films are described for example in U.S. Pat. No. 6,301,040B1 and find specific application as the light modulating unit of a light valve.

A typical SPD film comprises a suspension of particles dispersed throughout a liquid phase enclosed within one or more rigid or flexible solid films or sheets. Alternatively, an SPD film may comprise a discontinuous phase of a liquid comprising dispersed particles, the discontinuous phase being dispersed throughout a continuous phase of a rigid or flexible solid film or sheet.

When an electric field of sufficient magnitude is applied across the SPD film, the transmission characteristics of the film are influenced. Normally the active SPD layer is sandwiched between a pair of planar, optically transparent, electrically conductive electrodes. The electric field is applied via the planar electrodes and the active SPD layer sandwiched between the electrodes is affected in a uniform manner.

It is known that the transmission state of an entire SPD film can be varied from a low level (when the film is turned OFF) to a high level (when the film is turned ON). A sufficiently high electric field must be applied across the film to switch the transmission state of the film. There is a maximum light transmission for the film and it is possible to obtain intermediate levels of transmission by applying a lower magnitude electric field. Below a certain magnitude of applied field, the SPD film does not switch ON.

SPD films are normally used as an interlayer in a laminated glazing construction.

Other active layer materials are also known that have the property of variable light transmission under the influence of an applied electric field, for example films of electronic ink or layers of an organic light emitting diode (OLED) material.

Such electrically actuated materials are able to switch from one transmission level to another transmission level uniformly. That is, the medium in between the electrodes switches at substantially the same time, so to the human eye, the entire sheet of material changes from one level of light transmission to another level of light transmission. The variation in the optical transmission may be due to absorption or scattering.

In certain applications, it is not desirable to switch the entire glazing area and only a selected region thereof may require switching. In WO2007/010542A1, this effect is achieved by using a pre-determined shape of a film that is switchable. In US2007/0053053A1 an array of pixels is formed from panes of SPD Glass, each pixel being capable of being set to any shading level from 0% to 100%, the ends of the range being thought of as being Off and On. By selecting which pixel is turned on or off, and the shading level of each pixel, it is possible to display alphanumeric characters in the pixel array.

Such prior art methods use more than one sheet of SPD film, with one sheet being used for each switchable region. The switchable region is located in between a pair of electrodes and the entire region switches uniformly.

Such arrays of multiple, adjacent SPD films have the problem that they are difficult to construct. To switch more than one region, more than one piece of electrically isolated film is required, each requiring its own electrical connections thereto. This makes switching more difficult, because now there are many switchable elements instead of just one. In addition, once a glazing has been constructed, which is normally a laminated glazing with the SPD film in between the glazing panes, the area that may be switched is fixed and may not be changed without either (a) dismantling the glazing and subsequently reconstructing the glazing with the new desired region or regions that are able to be selectively switched or (b) replacing the glazing with a new glazing that has the appropriate configuration of SPD films.

There exists a need for a method of providing a switchable region of an electrically actuated variable transmission medium, particularly when the medium is in layer form, wherein it is possible to select a region that is switched in the medium.

Accordingly the present invention provides from a first aspect a method of switching an electrically actuated variable transmission layer, the layer being between a first electrode and a second electrode, wherein a sufficiently high frequency alternating electric field is applied between the first and second electrodes such that a selective region of the layer in between the first and second electrodes is switched.

By selectively switching the layer, the transition from one transmission state to another does not occur uniformly across the layer as observed by the human eye. The switching behaviour of the electrically actuated variable transmission layer may be due to the absorption properties or the scattering properties of the layer.

Preferably the selectively switched region has graded transmission.

Preferably the electrically actuated variable transmission layer comprises an SPD film or a liquid crystal containing film.

Preferably the frequency of the applied alternating electric field is greater than 1 kHz, more preferably greater than 10 kHz, even more preferably at least 20 kHz.

Suitably the frequency of the applied alternating voltage for an SPD film that is switched conventionally is in the range of 10 Hz to 400 Hz. Under such a frequency range, the switching of the SPD film across the entire film in between the electrodes from the OFF state to the ON state (and vice versa) is uniform to the human eye.

Preferably the electric field is applied via a power supply having a variable output voltage. Preferably the electric field is applied via a power supply having a variable output frequency. Preferably the electric field is applied via a power supply having a variable output waveform. Preferably there is a resistor in series with one of the electrodes and the power supply.

Preferably the applied electric field has a substantially rectangular waveform.

In a preferred embodiment, the electric field is applied by a direct galvanic connection to the first electrode and/or second electrode.

In another embodiment, the electric field is applied by at least one remote electrical connection that is remote to the first electrode and second electrode.

Suitably the electrical field is applied to by a plurality of electrical connectors associated with the first and/or second electrode.

The present invention also provides from a second aspect apparatus for use as a glazing pane, comprising a sheet of glazing material and an electrically actuated variable transmission layer facing the sheet of glazing material, the layer being sandwiched between a first electrode and a second electrode, and an electric field generator in electrical communication with the electrodes and being configured to produce an alternating electric field of sufficient strength and of a sufficiently high frequency to switch a selected region of the layer in between the first and second electrodes.

Preferably the layer is laminated between two sheets of glazing material. Suitably one or both of the sheets of glazing material may be of glass or plastic. One or both of the sheets of glazing material may be tinted.

Preferably the selected region has graded transmission.

Preferably the electric field generator is able to generate an alternating electric field having a frequency greater than 1 kHz, more preferably greater than 10 kHz, even more preferably greater than 20 kHz.

Preferably the electric field generator is in electrical communication with the first and/or second electrode via at least one direct galvanic connection thereto.

In another embodiment, the electrical field generator is in electrical communication with the first and or second electrode via a plurality of electrical connectors.

The electric field generator may be in electrical communication with the first and or second electrode via a plurality of electrical connectors.

In a preferred embodiment the glazing pane is a vehicle glazing pane. Preferably the glazing pane is a windscreen or a sunroof.

In another preferred embodiment, the glazing pane is a window in a building.

Embodiments of the present invention will now be described by way of example only with reference to the following figures (not to scale) in which, FIG. 1 shows a plan view of a conventional laminated glazing having an SPD film sandwiched between a pair of sheets of glazing material, wherein the SPD film is in the OFF position.

FIG. 3 shows a perspective view of an SPD film having cut away regions so that busbars can be connected to the electrically conductive layers.

FIG. 4 shows an exploded cross section of the glazing shown in FIG. 2 along the line A-A'.

FIG. 5 shows an exploded cross section of the glazing shown in FIG. 2 along the line B-B'.

FIG. 6 shows a cross section of the glazing shown in FIG. 2 along the line B-B'.

FIG. 7 shows a plan view of a conventional laminated glazing having two pieces of SPD film sandwiched between two sheets of glazing material.

FIG. 11 shows a plan view of a glazing pane that has been switched in accordance with the present invention.

FIG. 12 shows another plan view of a glazing pane that has been switched in accordance with the present invention.

FIG. 19 shows a cross section of an SPD that has a remote electrical connector.

FIG. 20 shows a cross section of another SPD film that has two remote electrical connectors.

Figure 2:
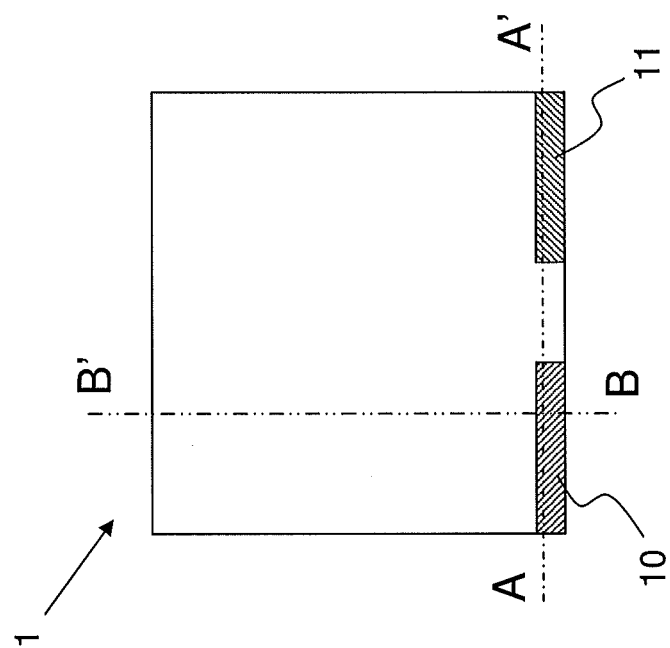
FIG. 2 shows a plan view of a conventional laminated glazing having an SPD film sandwiched between a pair of sheets of glazing material, wherein the SPD film is in the ON position

With reference to FIGS. 1 to 6 there is shown a conventional laminated glazing 1 comprising a single sheet of an electrically actuated SPD film 2. The SPD film 2 is laminated between a pair of optically transparent panes 3, 4, for example a pair of glass sheets or polycarbonate sheets.

With particular reference to FIG. 3, the SPD film 2 comprises a plurality of particles suspended within a liquid suspension medium, which are held within a polymer medium 5. The polymer medium is typically in the form of a sheet or layer. An electrically conductive layer 6, 7, typically ITO, is adhered to each face of the layer of polymer. The electrically conductive layers are electrodes. An electric field may be applied between these two electrodes so that an electric field is applied across the polymer layer. Usually covering each conductive layer 6, 7 is another protective layer (8, 9 respectively), typically of PET.

As is conventional in the art, electrical connections, known as busbars, are made to each conductive layer. The busbars allow the connection of other electrical components to the electrically conductive layers 6, 7. As is shown in FIG. 3, regions 18, 20 of the SPD film are removed to allow the busbars to be connected to the electrically conductive layers 6, 7.

A thin electrically conductive busbar 10 is connected to the lower conductive layer 6. Similarly, a thin electrically conductive busbar 11 is connected to the upper conductive layer 7. The busbars 10, 11 do not add significantly to the overall thickness of the SPD film. The busbars provide contact points for applying a voltage across the faces of the SPD film in order to switch the film. The cross section shown in FIG. 4 indicates the staggered arrangement of the busbars 10 and 11.

Although busbar 10 is shown as being connected to the upper surface of the electrically conductive layer 6, the busbar 10 may be connected to the lower surface of the layer 6. Likewise, although busbar 11 is shown as being connected to the lower surface of the electrically conductive layer 7, the busbar 11 may be connected to the upper surface of the electrically conductive layer 7.

The SPD film 2 comprising the busbars is laminated in between a pair of interleavant sheets of EVA 12, 13. In the region of the SPD film where the busbars are connected to the electrically conductive layers, some of the SPD film has been removed so that this connection could be made (see regions 18, 20 in FIG. 3). During the lamination of the SPD film between the EVA sheets, the interleavant sheets may flow into the region 18, 20 where the layers of the film have been removed. Although EVA was used, other suitable interleavant sheets may be used. Each interleavant sheet may be the same type or may be different. One of the interleavant sheets may be tinted. The EVA/SPD Film/EVA laminated assembly is then used as an interlayer to join the panes 3, 4 together to form the laminated switchable glazing 1, as shown in cross section in FIG. 6. Any suitable lamination technique known in the art may be used.

For this specific example, the laminated glazing 1 had a width 19 of about 300 mm, a height 21 of about 300 mm and a thickness 23 of about 5.4 mm. Each pane 3, 4 was a piece of clear float glass about 2.1 mm thick. Each of the interleavant sheets 12, 13 was EVA with a thickness of about 0.4 mm. The SPD film 2 had an overall thickness of about 0.34 mm.

The SPD film described above has the property of being "continuous". For clarity a continuous SPD film has the following property. The SPD film has on each of the opposed major surfaces of the polymer layer within which the active particles are contained, a layer of electrically conductive material that extends over the entire major surface. The entire volume of the polymer that is sandwiched between the two conductive layers is able to be actuated by the application of a switching voltage. For a switching voltage in the region of 150V rms at a frequency of 50-60 Hz, the applied electric field is able to affect the entire volume sandwiched in between the conductive layers. In normal operation the entire volume of polymer in between the conductive layers is switchable in a uniform way between a low transmission state to a high transmission state. The transition is uniform to the human eye. A continuous SPD film has a first electrically continuous electrode (in the form of an electrically conductive layer) that covers one surface of a physically continuous active layer, and another electrically continuous electrode (again in the form of an electrically conductive layer) that covers the opposite surface of the physically continuous active layer. The entire volume of the active layer in between the two electrodes may be influenced by the application of an electric field.

Conventional SPD films are manufactured to be continuous i.e. the active layer is a sheet, and the electrodes cover the entire major surfaces of the active layer in sheet form.

Figure 1:
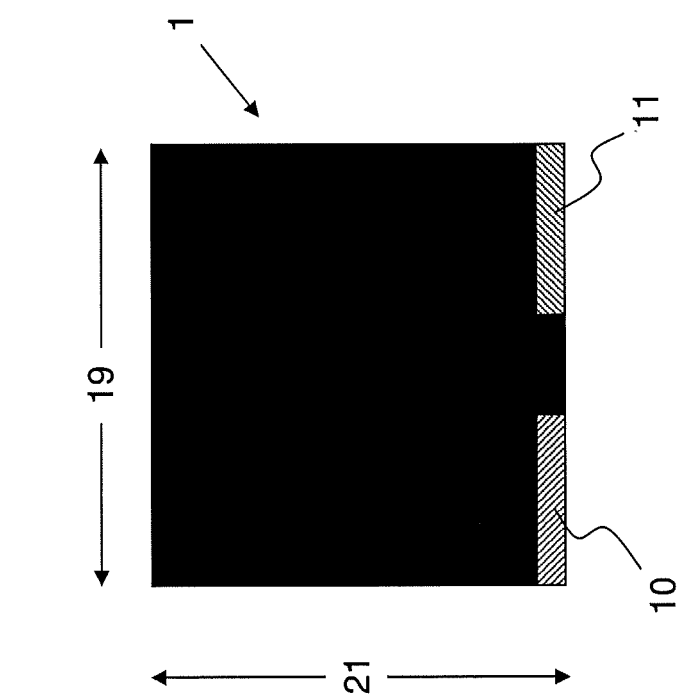

As is known in the art, and with reference to FIG. 1 and FIG. 6, when no voltage is applied between the upper electrically conductive layer 7 and the lower electrically conductive layer 6, the particles in polymer medium 5 of the SPD film assume random positions, and hence a beam of light passing through the glazing is either reflected, transmitted or absorbed, depending upon factors such as the nature and concentration of the particles, and the wavelength of the incident light beam. The laminated glazing 1 therefore has a low light transmission and the SPD film is said to be in the OFF state.

With particular reference to FIGS. 2 and 6, when a low frequency alternating voltage is applied to busbars 10, 11, an electric field is produced between the upper electrically conductive layer 7 and the lower electrically conductive layer 6. A strong enough electric field causes the particles in the SPD film to become aligned, thereby allowing light to be transmitted through the glazing. Consequently, the glazing has a uniform, or substantially uniform, transmission at each point through the glazing. The glazing 1 therefore assumes a light transmission that is higher than when in the OFF state, and the SPD film is said to be in the ON state.

A typical alternating switching voltage is 120V peak to peak, with a frequency of between 50-400 Hz. The switching voltage may be a 240V mains supply. Typically the to alternating switching voltage is a square wave, although other forms of alternating switching voltage may be used to provide the ON state, for example a sawtooth or sinusoidal waveform. Typical waveform generators include a conventional mains electricity supply, a signal generator and amplifier or a signal generator plus amplifier plus transformer.

When switching between the OFF state shown in FIG. 1 and the ON state shown in FIG. 2, the transition from low light transmission to high light transmission is substantially uniform over the entire glazing. That is, to the human eye, the glazing switches uniformly from having low light transmission to high light transmission.

As is known in the art, it is possible to vary the transmission of the glazing by altering the magnitude of the applied switching voltage. For example, for a given switching frequency, if the magnitude of the switching voltage is reduced, the maximum transmission in the ON state is also reduced. Typically the maximum light transmission is obtained when the magnitude of the switching voltage is in the range 120V to 240V.

Note that in the cross sections shown in FIGS. 5 and 6, the busbar 11 is shown in phantom.

It is known that in order to provide a glazing wherein selected regions may be switched, a discontinuous SPD film may be used. This is illustrated in FIG. 7.

FIG. 7 shows a laminated glazing 25 comprising two separate pieces of SPD film 27, 29. The two SPD films 27, 29 may be cut from a single sheet of SPD film. The SPD film 27 is provided with busbars 31, 33 and the SPD film 29 is provided with busbars 35, 37. The SPD films are of the type described with reference to FIG. 3 and the respective busbars may be applied in the same way. The two SPD films 27, 29 are electrically and physically separated but both are laminated between a pair of glazing panes. By providing a switching voltage to the busbars 31, 33, the SPD film 27 may be switched to the ON state. Likewise, by providing a switching voltage to the busbars 35, 37, the SPD film 29 may be switched to the ON state. Both pieces of SPD film 27, 29 may be independently switched, such that the glazing has two independently switchable regions 26, 28.

This arrangement of glazing is difficult to manufacture and the selected region to be switched must be determined prior to lamination. After lamination, only pre-determined regions having a separate piece of SPD film and associated busbars can be selectively switched. The two SPD films can be thought of as individual pixels, each pixel having a low light transmission OFF state and a high light transmission ON state. Intermediate levels of light transmission may be obtained by suitable choice of the magnitude of the switching voltage.

Figure 8:
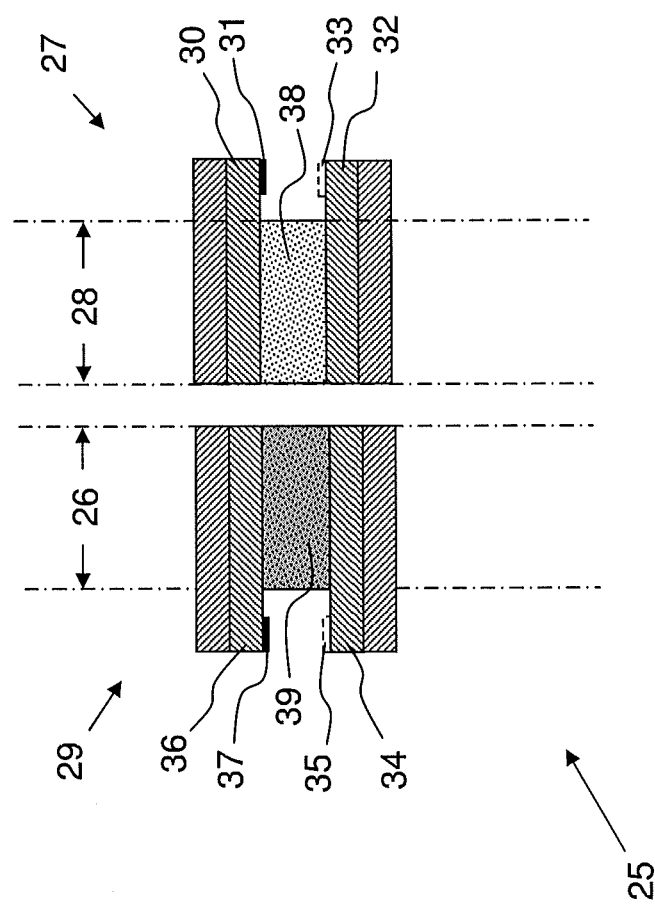
FIG. 8 shows a cross section of the two SPD films used in the glazing shown in FIG. 7 along the line C-C'.

FIG. 8 shows a cross section along the line C-C' in FIG. 7 of the SPD films used in the glazing 25 shown in FIG. 7. For clarity, the glazing panes are not shown. The busbars 31, 33 are electrically connected to the respective electrically conductive upper layer 30 and lower layer 32 of the SPD film 27. The busbars 35, 37 are electrically connected to the respective electrically conductive lower layer 34 and upper layer 36 of the SPD film 29. Busbars 35, 37 are shown in phantom only. Other configuration of busbar may be used. Sandwiched between the electrically conductive layers 30, 32 is an electrically actuated variable transmission layer 38, and sandwiched between the electrically conductive layers 34, 36 is an electrically actuated variable transmission layer 39. The layers 38, 39 are polymer layers of the SPD film that contain the electrically actuated particles. As previously described, each SPD film 27, 29 has protective layers covering the electrically conducting layers 30, 32, 34, 36. By applying a suitable electric field between the upper conductive layer 30 and lower conductive layer 32 the layer 38 can switch ON to a high light transmission state, such that the transmission of the glazing is different in region 26 than region 28. By virtue of the two electrically and physically separated SPD films 27, 29, the glazing 25 has two independently switchable regions 26, 28.

Figure 9:
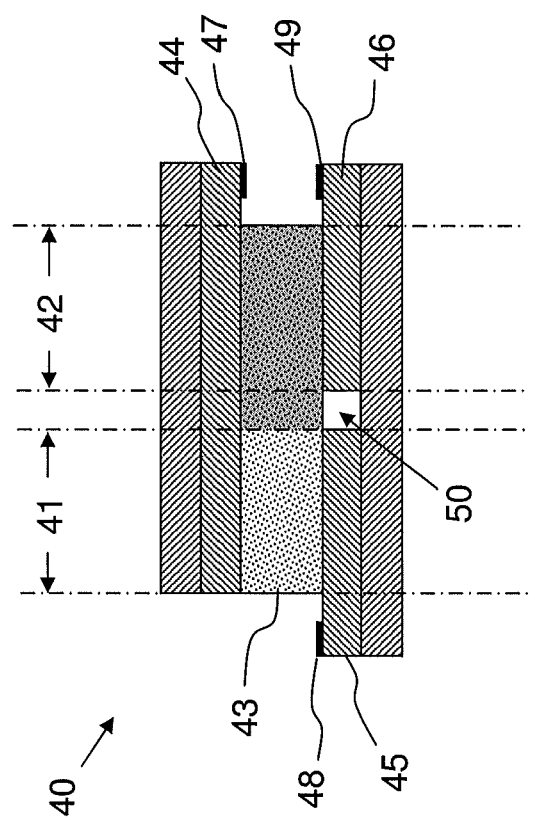
FIG. 9 shows a cross section of another discontinuous SPD film.
Figure 10:
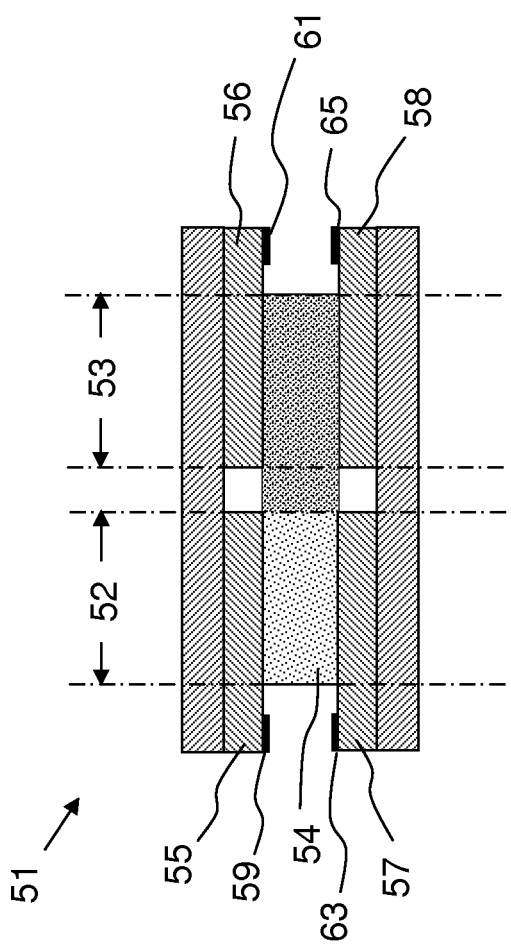
FIG. 10 shows a cross section of yet another discontinuous SPD film.

Alternative SPD film configurations for use in laminated glazing constructions comprising discontinuous films are shown in cross section in FIG. 9 and FIG. 10. Again for clarity, the glazing panes are not shown in either of these figures.

In FIG. 9 there is shown an SPD film 40 that has two individually switchable regions 41, 42 within the polymer medium of the SPD film. The SPD film comprises a continuous polymer layer 43 that contains the electrically actuated particles. On the upper surface of the polymer layer 43 is an electrically conductive layer 44. On the lower surface of the polymer layer 43 are two electrically separated, electrically conductive layers 45, 46. A protective layer covers each electrically conductive layer. A busbar 47, 48, 49 is connected to the respective electrically conductive layer 44, 45, 46. The SPD film 40 has two individually switchable regions 41, 42. By applying an appropriate switching voltage to busbars 47, 48, the region 41 of the SPD film may be selectively turned ON (as shown). The region 42 may be switched on by applying an appropriate magnitude switching voltage to the busbars 47, 49. This is a discontinuous SPD film because of the two electrically separated, electrically conductive layers 45, 46. The discontinuity 50 in the lower electrically conductive coating may be introduced during the manufacture of the film of may be introduced by a subsequent process.

In FIG. 10 there are two individually switchable regions 52, 53 within the polymer medium of the SPD film 51. The SPD film comprises a continuous polymer layer 54. On the upper surface of polymer layer 54 there are two electrically separated, electrically conductive layers 55, 56. On the lower surface of the polymer layer 54 there are two electrically separated, electrically conductive layers 57, 58. Layer 55 is in registration with layer 57 and layer 56 is in registration with layer 58.

Connected to each electrically conductive layer 55, 56, 57, 58 is a respective bulbar 59, 61, 63, 65. By applying a switching voltage to busbars 59, 63, the region 52 of the SPD film may be selectively switched ON whilst the region 69 remains in the OFF state. Both regions 52, 53 may be switched ON by applying a switching voltage to busbars pair 59, 63 and 61, 65. The switching voltages may be different so that the transmission in each region 52, 53 is different. This is a discontinuous SPD film because the upper and lower electrically conductive layers are two electrically separated regions. The discontinuity in the electrically conductive layers may be introduced during manufacture of the film or by subsequent processing using techniques known in the art.

FIG. 11 shows a laminated glazing that has a construction as described with reference to FIGS. 1 to 6. The laminated glazing 1 that has been switched in accordance with the present invention. A high frequency alternating switching voltage is applied to the busbars 10, 11. The peak to peak voltage of the applied voltage was about 120V. The applied voltage was a substantially square wave with a frequency of 20 kHz.

In contrast to applying a low frequency alternating switching voltage to the busbars 10, 11, only a selected region 74 of the continuous SPD film switches to the ON state. A region 75 remains in the OFF state. A region is produced across the SPD film (between 71 and 71') that has graded transmission.

By graded transmission, it is meant that the region has in one direction a variation in visible light transmission, ranging from a low transmission that gradually changes to a high transmission. There may be two directions in which there is graded transmission. Preferably the high transmission region of the graded transmission region is substantially the same transmission as the transmission of the glazing in the ON state. Preferably the high transmission region has a transmission of about 40% measured (calculated using Illuminant C or D65 weighting factors).

FIG. 12 shows the laminated glazing 1 as described with reference to FIGS. 1 to 6 wherein the frequency of the applied alternating switching voltage is lower than in FIG. 11 i.e 10 kHz. The graded transmission region (between 79 and 79') extends further from the lower edge of the glazing where the busbars 10, 11 are located. More of the lower portion 77 of the SPD film has switched to the ON state and part of the upper portion 78 of the SPD film is still in the OFF state. The lower portion 77 of the continuous SPD film has been selectively switched on. The graded transmission region (between 79 and 79') has moved to the upper part of the glazing.

The switching voltage was applied by a suitably constructed voltage generator comprising a signal generator, an audio amplifier and a transformer. The output of the voltage generator was a signal wherein the frequency was variable between 50 Hz and 20 kHz, and the voltage output was variable between 0 and 140V rms.

Within the graded transmission region, the applied voltage is sufficient to slightly affect the orientation of the particles in the SPD film, such that the SPD film is in an intermediate state that is in between the ON state and OFF state.

In contrast to a conventional laminated glazing comprising an SPD film, by driving the film with a high frequency voltage it is possible to select a region within the glazing that is switched. In addition, a graded transmission region may be produced.

The extent of the graded transmission region may be affected by varying the frequency of the applied voltage, the maximum peak to peak voltage and the nature of the alternating voltage waveform i.e. square wave, sawtooth or sinusoidal.

Additionally, the location and position and number of the busbars will also affect the switching of the SPD film. For example, in an alternative embodiment to that shown in FIG. 1 and FIG. 11, the busbar 11 may be located on the upper edge of the glazing, whilst still being in electrical communication with the upper conductive layer 7.

Figure 13:
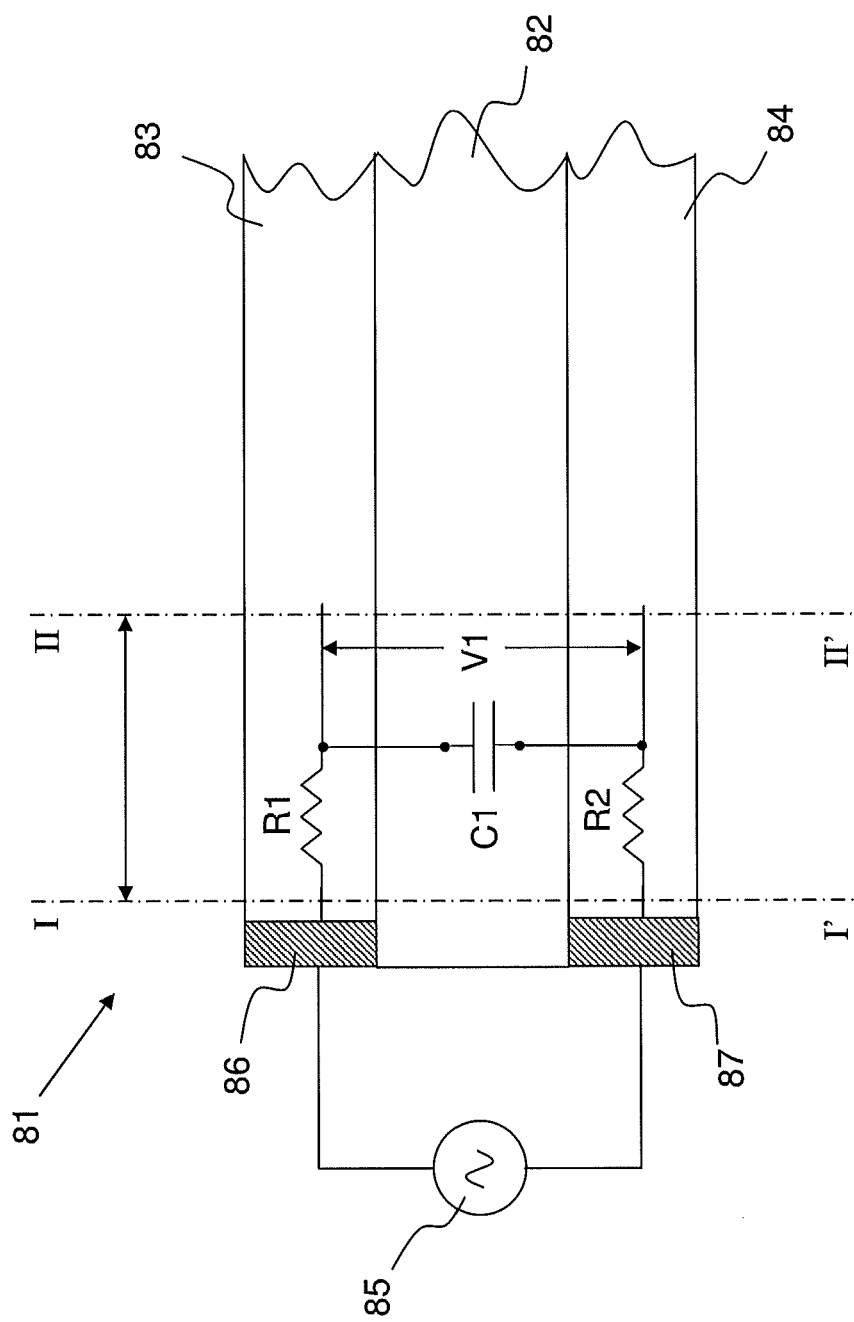
FIG. 13 shows an RC circuit diagram representation of an SPD film.
Figure 14:
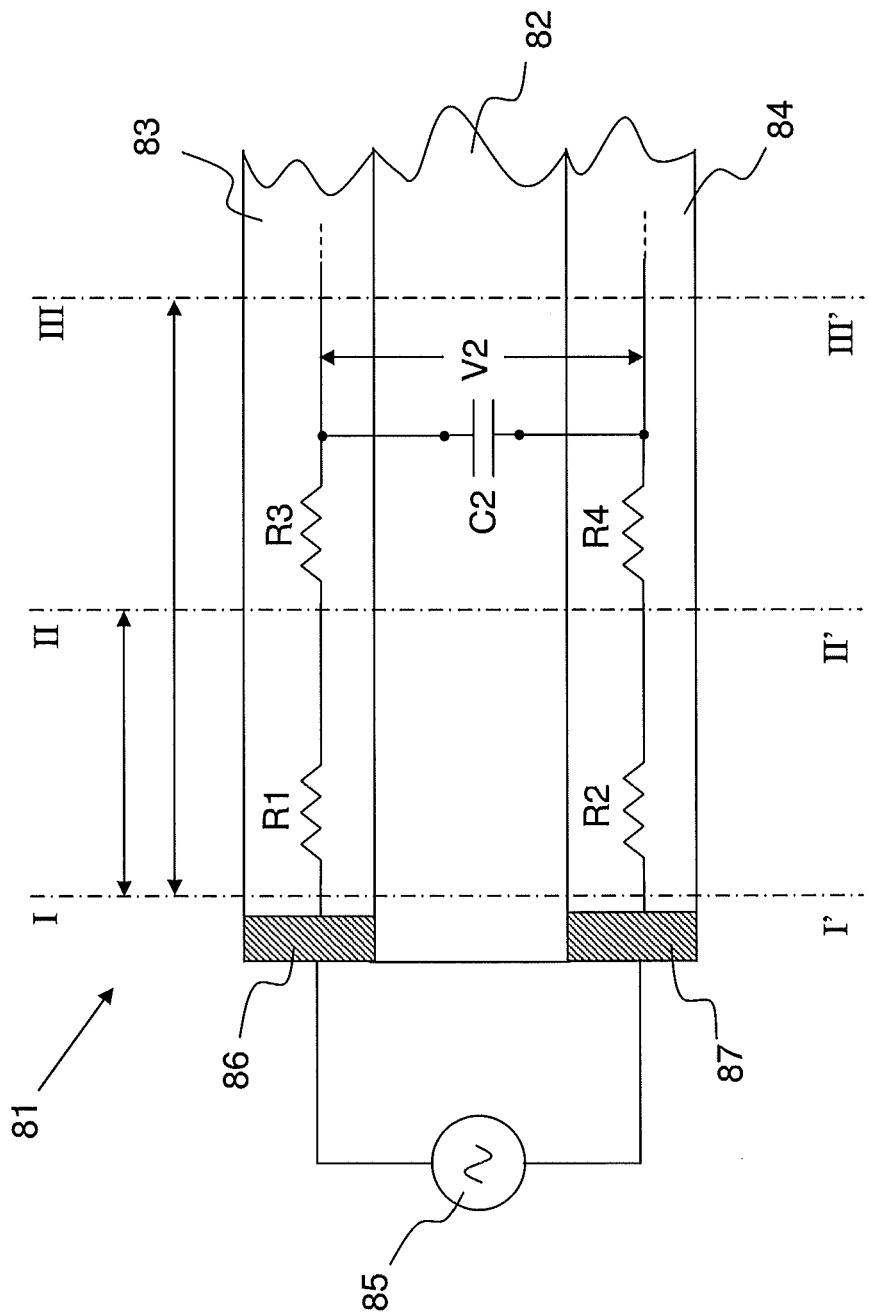
FIG. 14 shows another RC circuit diagram representation of the SPD film shown in FIG. 13.

Without being bound by any particular theory, one possible explanation for the observed behaviour is given with reference to FIGS. 13 and 14. A cross section of part of an SPD film 81 is shown. In these figures the SPD film 81 is represented by a simple resistance (R)~capacitor (C) circuit. The SPD film comprises an active polymer medium layer 82. On the upper surface of the polymer layer 82 is an electrically conductive coating 83 and on the lower surface of the polymer layer 82 is an electrically conductive coating 84. An AC signal generator 85 is electrically connected to the SPD film via busbars 86,

87. The busbars 86, 87 are in electrical communication with the respective electrically conductive coating 83, 84.

For a simple series RC circuit, as shown in between lines I-I' and II-II' of FIG. 13, the time constant for the circuit τ is given by [R1+R2]×C1. When a voltage is applied across the electrically conductive layers 83, 84, the time constant τ for the circuit in between I-I' and II-II' is the time taken for the voltage V1 at that point across the SPD film to reach about 63% of the maximum applied voltage.

As the distance along the film from the busbars increases, for example as shown by the circuit between the lines I-I' and of FIG. 14, the time constant of the circuit increases because the resistance increases. With reference to FIG. 14, the time constant τ of the circuit between I-I' and is [R1+R2+R3+R4]×C2. The distributed capacitance across the two conductive layers 83, 84 remains the same. Therefore, the time constant τ is longer the further away from the busbars 86, 87. It now takes more time for the voltage V2 across the SPD film at that point to reach about 63% of the maximum applied voltage. Therefore as the distance from the busbars increases, the time constant increases, so that it takes longer to reach the necessary voltage across the conductive layers to switch the SPD film. Hence it will be readily apparent that there will be a certain distance from the busbars, where when an alternating switching voltage is applied across the SPD film, the voltage across the electrically conductive layers does not have time to reach the magnitude necessary to switch the SPD film before the alternating switching voltage switches. As a consequence, not only will a graded transmission region be produced, because the time constant τ varies with distance long the SPD film, but there will also be a point where the switching voltage is not able to reach the required level before the alternating switching voltage turns off.

The above theory predicts that for a sufficiently high frequency switching voltage, there will be three regions in the SPD film of different transmission, (i) a region that is able to be switched ON where the electric field across the conductive layers is able to attain the necessary magnitude to switch, (ii) a region where the magnitude of the electric field across the conductive layers varies because of the varying time constant effect, and (iii) a region where the electric field is not able to attain the necessary magnitude to allow the SPD film to switch on because the time constant is sufficiently long and the frequency of the applied electric field is sufficiently fast. Hence region (i) will have high light transmission, region (ii) will have graded transmission and region (iii) will have low light transmission.

In practice the SPD film may have a very high leakage resistance between the two conductive layers, although this should have little influence on the production of a graded transmission region.

Additionally the above theory indicates the importance of the resistance of the electrically conductive layers and the capacitance of the pair of electrically conductive layers. If the electrically conductive layers change so that there is a different resistance (typically measured per square), the frequency where non-uniform switching occurs will vary and need to be determined accordingly. Likewise, the capacitance of the electrically actuated variable transmission layer/electrode construction will affect the frequency where non-uniform switching occurs. The sheet resistance of the two electrically conductive layers may be the same or different.

It will be readily apparent to one skilled in the art that the time constant of the entire film will be increased by any series resistance in between AC signal generator 85 and one or both of the electrically conductive layers 83, 84. Such series resistance may be contact resistance or actual resistors in between the AC signal generator and busbar. With suitably high resistances the film can be made to switch to a lower transmission level due to the increased time constant (and possibly voltage drop across this resistor). However, specific series resistance could be introduced that work in combination with the sheet resistance of the film. Whilst it is the sheet resistance of the film that causes the film to have graded transmission, the sensitivity to the sheet resistance could be altered by choosing different series resistances. Additionally, different series resistance could be used for each supply side (i.e. between the signal generator and one or both busbars), skewing the graded transmission region. Furthermore, variable resistors could be used on each supply leg to add additional control over the size and position of the clear area (the switched ON region), and also the dimensions of the graded transmission region.

For an SPD film supplied by Hitachi, each electrically conductive layer is an ITO coating deposited on the inner surface of a PET protective layer i.e. the ITO coating is sandwiched between the SPD polymer layer and the PET protective layer. The sheet resistance of each electrically conductive layer in such an SPD film is 220-260 ohm/square. A 240×240 mm sheet of this film has a capacitance of about 20 nF.

Other SPD films are available wherein the sheet resistance is 350 ohms/square and the capacitance is 40 nF per square foot (see for example US2004/0160660A1).

Liquid crystal containing films are available commercially wherein each electrically conductive layer has a sheet resistance of about 100 ohms/square.

Figure 15:
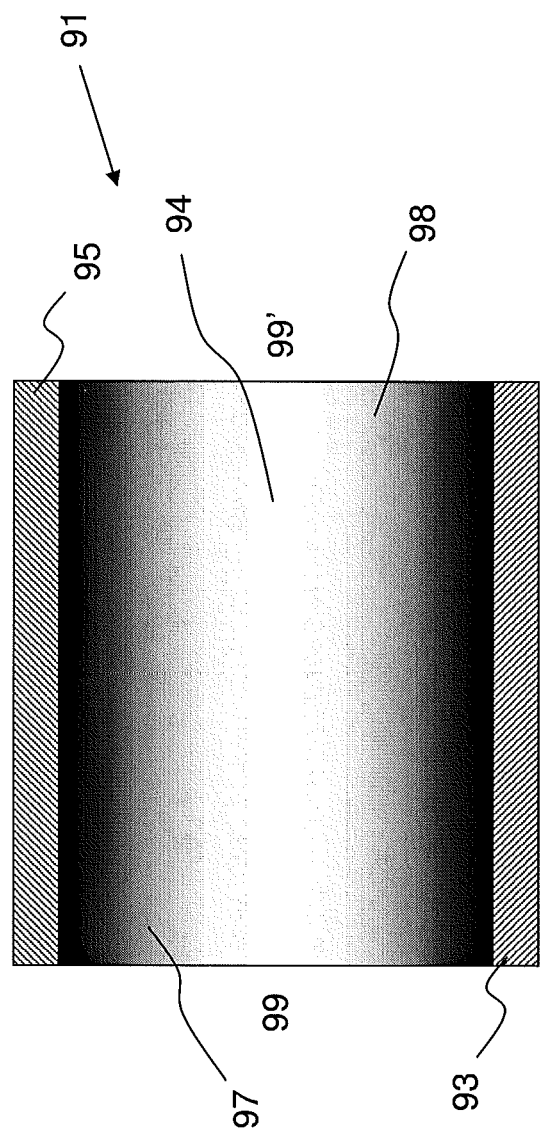
FIG. 15 shows a plan view of another glazing pane that has been switched in accordance with the present invention.

FIG. 15 shows another switchable laminated glazing 91 comprising an SPD film. The SPD film faces each pane of glazing material and the SPD film has substantially the same size major surface as the major surface of each pane of glazing material.

In this example, the busbar 93 connected to the lower electrically conductive layer extends along the entire width of the glazing and is located at the bottom edge of the glazing. The busbar 95 connected to the upper electrically conductive layer also extends across the entire width of the glazing and is located at the upper edge of the glazing.

When no voltage is applied between the busbars 93, 95, the glazing has low light transmission because the SPD film is in the OFF state. By applying a low frequency voltage i.e. 10 to 400 Hz, between the busbars 93, 95, the SPD film uniformly switches to the ON state and the laminated glazing switches from having a uniform low transmission to a uniformly high transmission. As in the example described with reference to FIGS. 1 and 2, the transition from the OFF state to the ON state is uniform as observed by the human eye.

By applying a suitable high frequency voltage i.e. 25 kHz, to the busbars 93, 95, a selective region 94 of the glazing 91 is switched ON. The region switched ON extends between edges 99 and 99'. Furthermore, there are two regions of graded transmission region 97, 98 that also extend between the edges 99, 99'. The SPD film is only able to switch on where the electric field across the electrically conductive layers is sufficiently high to maintain the necessary magnitude of electric field so that the SPD film can switch.

The selected region may be chosen by selecting an appropriate high frequency for the applied switching voltage between the busbars 93, 95.

It will be readily apparent that the precise frequency wherein a selective region of an SPD film may be switched ON depends upon the dimensions of the SPD film and the geometry thereof i.e. whether rectangular or circular for example. For a given geometry of SPD film, busbars may be suitably located to selectively switch a given region of the SPD film to the ON state when a sufficiently high frequency is applied to these busbars. The frequency of the applied switching voltage may also be chosen to affect switching behaviour of the SPD film in the desired location.

For a given geometry of SPD film and location of busbars, it is possible to determine the lowest frequency, $f_{min}$ upon which the continuous SPD film begins to switch non-uniformly. The frequency $f_{min}$ is dependent upon the size of the film. For example, for a 300 mm×300 mm SPD film, $f_{min}$ is around 10 kHz. The value of $f_{min}$ will be film specific and depends also upon the specific waveform of the applied electric field, the magnitude of the supply voltage and the resistance of the electrically conductive coating layers between which the electrically actuated variable transmission layer is sandwiched.

Therefore, by increasing the frequency of the applied switching voltage it is possible to alter the region of the SPD film that is selectively switched. This makes it possible for the SPD film to switch non-uniformly in a manner that resembles a blind or curtain being drawn open. The graded transmission region can be made to move by varying the frequency of the applied voltage.

Factors that may be used to influence the graded transmission region include the magnitude of the applied electric field (or voltage), the dimensions of the electrically actuated variable transmission layer, actual geometry of the electrically actuated variable transmission layer, particular aspect ratio of the electrically actuated variable transmission layer (particularly with respect to the location of the busbars), the size of the busbars, the number of the busbars (there may be two or more) and the location of the busbars. In addition the electrical characteristics of the particular electrically conductive layers in between which the electrically actuated variable transmission layer is sandwiched will also have an effect, for example, the specific sheet resistance of the electrically conductive layers and the capacitance of them.

It will also be readily apparent that for a given size of SPD film and arrangement of busbars, there will be a frequency ($f_{max}$) of applied electric field above which the SPD film is not switchable to the ON state.

In an alternative embodiment to that shown in FIG. 15, for a rectangular SPD film, there may be four busbars, one in each corner. By initially having a sufficiently high frequency electric field of sufficient magnitude applied to each of the four busbars, and then by reducing the frequency of the applied electric field to each busbar, the SPD film appears to switch from the corners.

Figure 16:
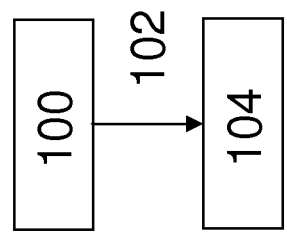
FIG. 16 shows a schematic of the conventional method of switching a conventional SPD film.

For a conventional method of switching an SPD film, reference is made to FIG. 16. At step 100 the SPD film is in the OFF state (as shown in FIG. 1). Applying a low frequency voltage at step 102 causes the SPD film to switch uniformly to the ON state (as shown in FIG. 2). The voltage at step 102 is typically 120-240V peak to peak at 50-60 Hz. The transition from the OFF state to the ON state causes the SPD film having a low level of light transmission to uniformly switch to having a higher level of light transmission. The transition from the OFF state to the ON state is uniform to the human eye. The actual transmission level of the SPD film in the ON state depends upon the magnitude of the applied electric field.

Figure 17:
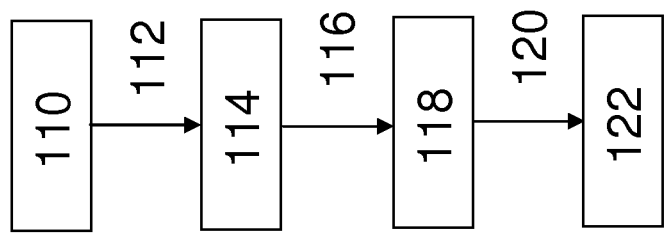
FIG. 17 shows a schematic of the method in accordance with the present invention of switching a conventional SPD film.

For a method of switching in accordance with the present invention, reference is made to FIG. 17. At step 110, the SPD film is in the OFF state (as is shown in FIG. 1). By applying a high frequency voltage at step 112 wherein the frequency is greater than $f_{min}$, the SPD film switches non-uniformly so that at step 114, only a selected region of the SPD film is switched ON (for example as is shown in FIG. 11). At step 116, the frequency of the applied switching voltage may be reduced compared to that used at step 112, whilst still being above $f_{min}$. Consequently more of the SPD film will be switched to the ON state at step 118 (as is shown in FIG. 12). Reducing the frequency of the applied voltage at step 120 below $f_{min}$, the entire SPD film is switched ON at step 122 and the glazing has a uniform high transparency, as shown in FIG. 2.

In FIG. 17 the SPD film is indicated as having two intermediate stages (at step 114 and 118) between the ON and OFF states at step 110 and 122 respectively. There may be many intermediate stages in between the ON and OFF states so that the transition from OFF to ON varies smoothly from one end of the film to the other end of the film (and hence the glazing in which the SPD film may be incorporated). If desired, the final state 122 may be one wherein the SPD film has a region of graded transmission. When this is the case the driving voltage is maintained at or above $f_{min}$ to achieve this final desired state. Alternatively, the initial state 100 may be the same as the initial state 110, and the final state 104 may be the same as the final state 122.

By reversing the above steps, the SPD film may be switched from the ON state to the OFF state in a manner that resembles a blind or curtain closing.

Figure 18:
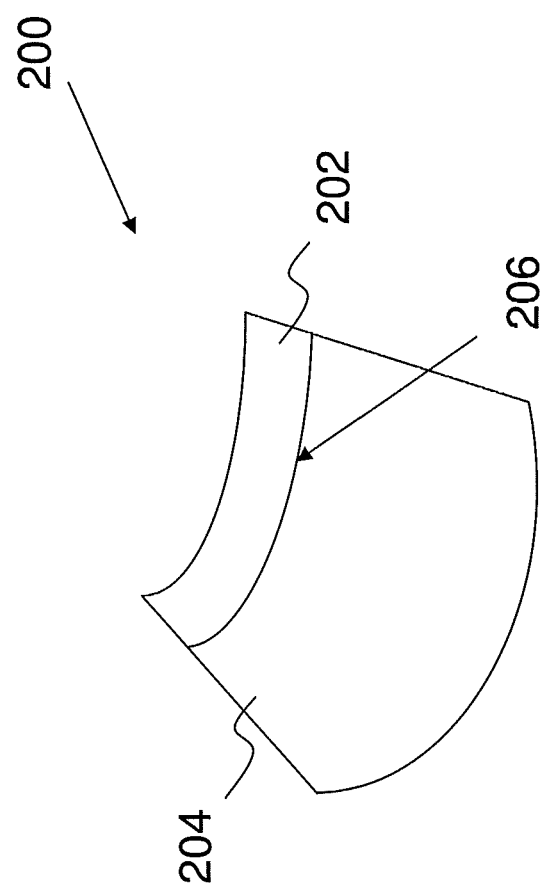
FIG. 18 shows a perspective view of a vehicle windscreen comprising a shade band.

A particular application of the present invention is to provide a sunshade for a vehicle windscreen. As shown in FIG. 18, a conventional laminated vehicle windscreen 200 may have an upper region 202 that has a lower light transmission than the remainder of the windscreen 204. This upper region 202 is known as a shade band and is normally provided by a suitably tinted interlayer material. In a conventional windscreen, once the shade band is incorporated into the laminate, it remains fixed in position and cannot be changed without complete replacement of the windscreen. The boundary 206 between the shade band and the conventional interlayer is typically a region of graded transmission to avoid the sharp transition between the low light transmission region 202 and the high light transmission region 204.

By replacing the laminate material in the region 202 with a suitable interlayer material comprising an SPD film, a switchable shade band may be provided. When the SPD film is in the ON position, the upper region 202 would have a high light transmission. By switching the SPD film with an alternating voltage having a frequency above $f_{min}$, a shade band may be produced. The distance the shade band extends may be altered by selecting the frequency of the applied switching voltage (ensuring the windscreen still meets legal requirements for light transmission). This has the advantage that the shade band may react in response to the position of the sun in the sky, thereby reducing the amount of glare.

Another application for the present invention is a sunroof for a vehicle. By incorporating a continuous SPD film into a laminated glazing for a vehicle sunroof, and switching the SPD film in accordance with the present invention, it is possible to switch the continuous SPD film non-uniformly as described with reference to FIG. 17, such that the transition of the SPD film from the ON to OFF state (or vice versa) resembles a blind or curtain opening or closing. Similarly, the present invention finds application for a switchable side window or rear backlight in a vehicle such as a car or a bus.

Yet another application of the present invention is for a switchable window in a building. Using the method according to the first aspect of the invention, a large office window could have a dark, shaded region near the upper part of the window when the sun was high in the sky. As the day drew on, the dark region could be moved down the window to provide adequate shading as the sun got lower in the sky.

FIG. 19 shows an SPD film 300 consisting of an electrically actuated variable transmission layer 302 of an SPD emulsion in between a first electrode layer 304 and a second electrode layer 306. The first electrode layer 304 comprises a PET substrate 308 with an electrically conductive ITO coating 310 disposed on a surface thereof. The second electrode layer 306 comprises a PET substrate 312 having an electrically conductive coating 314 disposed on a surface thereof. The electrically conductive ITO coatings 310, 314 are electrodes. The SPD film 300 is configured such that the active layer 302 is in between the PET substrate 308 and the electrically conductive ITO coating 314, and the electrically conductive coating 314 is in between the active layer 302 and the PET substrate 312. There may be an overcoat layer on one or more of the surfaces of the active layer 302 that face the electrode layers 302, 304.

There is a direct galvanic connection to the electrically conductive coating 310 by an electrical connector 316. There is a remote electrical connector 318 that is remote to the electrically conductive ITO coatings 310, 314 (and the active layer 302), the remote electrical connector 318 being positioned on the uncoated surface of the PET substrate 312.

The SPD film can be connected to a suitable power supply via the electrical connector 316 and the remote electrical connector 318. Upon applying a sufficiently high frequency alternating voltage between the electrical connector 316 and the remote electrical connector 318, an electric field is applied across the active layer such that a selective region of the layer in between the electrically conductive coatings 310, 314 is switched.

FIG. 20 shows an SPD film 400 consisting of an electrically actuated variable transmission layer 402 of an SPD emulsion in between a first electrode layer 404 and a second electrode layer 406. The first electrode layer 404 comprises a PET substrate 408 with an electrically conductive ITO coating 410 disposed on a surface thereof. The second electrode layer 406 comprises a PET substrate 412 having an electrically conductive coating 414 disposed on a surface thereof. The electrically conductive ITO coatings are electrodes. The SPD film 400 is configured such that the active layer 402 is in between the two electrically conductive ITO coatings 410, 414. There may be an overcoat layer on one or both of the surfaces of the active layer facing the electrode layers 404, 406.

There is a first remote electrical connector 416 located on the uncoated surface of the PET substrate 408. There is a second remote electrical connector 418 located on the uncoated surface of the PET substrate 412. The first and second remote electrical connectors are remote to the electrically conductive ITO coatings 410, 414 and the active layer 402.

The SPD film can be connected to a suitable power supply via the first and second remote electrical connectors 416, 418. Upon applying a sufficiently high frequency alternating voltage between the remote electrical connectors 416, 418, an electric field is applied across the active layer such that a selective region of the layer in between the electrically conductive coatings 410, 414 is switched.

The present invention has the advantage that a selected region of a continuous SPD film may be switched to the ON state, leaving another selected region of the continuous SPD film in the OFF state. Additionally, the present invention provides a method of producing a graded transmission region in a continuous SPD film. The position of the graded transmission region may be movable within the film by selecting an appropriate range of high frequencies for the alternating switching voltage.

It will be readily apparent to one skilled in the art that, using the method of switching in accordance with the first aspect of the invention, the electrically actuated variable transmission layer may be incorporated into glazing elements in ways that are known in the art. Additionally, the glazing element may comprise glass or plastic panes.

In the specific examples of the invention, rectangular busbars are shown. However, one or more of the busbars may be shaped such that a particular pattern is created within the electrically actuated variable transmission layer.

Although the specific examples described herein refer to glazings comprising a continuous SPD film, it will be readily apparent to one skilled in the art that the SPD film may be substituted for other electrically actuated variable light transmission materials, such as liquid crystal containing films or films comprising organic light emitting material or electronic ink.

The specific examples refer in particular to electrically actuated, variable transmission layers that affect the transmission of visible light. By careful choice of the electrically actuated variable transmission material, the transmission of other electromagnetic energy may be influenced, for example in the ultra violet or infra red regions of the electromagnetic spectrum. The variable transmission may be due to absorption or scattering.

Furthermore, it will be readily apparent that the present invention requires the generation of a sufficiently high frequency alternating electric field across the electrically actuated variable transmission layer. The specific examples refer to an electrically actuated variable transmission layer that has electrodes that cover the entire major surfaces of the active layer, and wherein busbars are directly connected to each electrode layer. An electric field generator may be in direct electrical communication with the electrodes via the busbars. However it is possible for the electric field generator to be in indirect electrical communication with the electrodes, for example by capacitive coupling. In this case, busbars may be deposited on the protective layers that cover each of the electrodes, thereby providing an indirect electrical connection between the busbar and the electrode. In addition, the present invention may be carried out by adopting a re-designed film structure that enables the utilisation of remote electrical connections. A remote electrical connection is one that is not in contact with the active layer of the switchable film to be driven by an electric field generator, i.e. an external power supply, and also not in contact with the first and second electrodes. The remote electrical connector enables an electric field to be projected through the active layer, driving the switching process. Such remote electrical connections may be capacitive in nature.

The invention claimed is:

1. A method of switching an electrically actuated variable transmission layer, the layer being between a first electrode and a second electrode, wherein a sufficiently high frequency alternating electric field is applied between the first and second electrodes such that a selective region of the layer in between the first and second electrodes is switched, wherein the frequency of the applied electric field is greater than 1 kHz.

2. A method according to claim 1, wherein the selectively switched region has graded transmission.

3. A method according to claim 1, wherein the electrically actuated variable transmission layer comprises an SPD film or a liquid crystal containing film.

4. A method according to claim 1, wherein the electric field is applied via a power supply having a variable output voltage.

5. A method according to claim 4, wherein there is a resistor in series with one of the electrodes and the power supply.

6. A method according to claim 1, wherein the electric field is applied via a power supply having a variable output frequency.

7. A method according to claim 1, wherein the electric field is applied via a power supply having a variable output waveform.

8. A method according to claim 1, wherein the applied electric field is a substantially rectangular waveform.

9. A method according to claim 1, wherein the electric field is applied by a direct galvanic connection to the first electrode and/or second electrode.

10. A method according to claim 9, wherein the electrical field is applied by a plurality of electrical connectors associated with the first and/or second electrode.

11. A method according to claim 1, wherein the electric field is applied by at least one remote electrical connection that is remote to the first electrode and second electrode.

12. The method according to claim 1, wherein the frequency of the applied electric field is greater than 10 kHz.

13. The method according to claim 1, wherein the frequency of the applied electric field is greater than 20 kHz.

14. Apparatus for use as a glazing pane, comprising a sheet of glazing material and an electrically actuated variable transmission layer facing the sheet of glazing material, the layer being sandwiched between a first electrode and a second electrode, and an electric field generator in electrical communication with the electrodes and being configured to produce an alternating electric field of sufficient strength and of a sufficiently high frequency to switch a selected region of the layer in between the first and second electrodes, wherein the electric field generator is able to generate an alternating electric field having a frequency greater than 1 kHz.

15. Apparatus according to claim 14, wherein the layer is laminated between two sheets of glazing material.

16. Apparatus according to claim 14, wherein the selected region has graded transmission.

17. Apparatus according to claim 14, wherein there is a resistor, preferably a variable resistor, in series with the electric field generator and one of the electrodes.

18. Apparatus according to claim 14, wherein the electric field generator is in electrical communication with the first and/or second electrode via at least one direct galvanic connection thereto.

19. Apparatus according to claim 18, wherein the electrical field generator is in electrical communication with the first and/or second electrode via a plurality of electrical connectors.

20. Apparatus according to claim 14, wherein the electric field generator is in electrical communication with the first and/or second electrode via at least one remote electrical connection that is remote to the first electrode and second electrode.

21. Apparatus according to claim 14, wherein the glazing pane is a vehicle glazing pane, preferably a windscreen or a sunroof, or a window in a building.

22. A vehicle, in particular a car, comprising an apparatus according to claim 14.

23. A building comprising an apparatus according to claim 14.

24. The apparatus according to claim 14, wherein the electric field generator is able to generate an alternating electric field having a frequency greater than 10 kHz.

25. The apparatus according to claim 14, wherein the electric field generator is able to generate an alternating electric field having a frequency greater than 20 kHz.

26. Use of an electrically actuated variable transmission layer by applying an electric field across the entire layer of sufficient magnitude to switch the layer on and of a sufficiently high frequency to simultaneously produce: (i) a graded transmission region in a first portion of the layer, and (ii) a transparent region in a second portion of the layer.

27. Use of an SPD film or a liquid crystal film according to claim 26.

28. Use of the electrically actuated variable transmission layer according to claim 26, wherein the applied electric field is an alternating electric field having a frequency greater than 1 kHz.

* * * * *